Patented Apr. 26, 1949

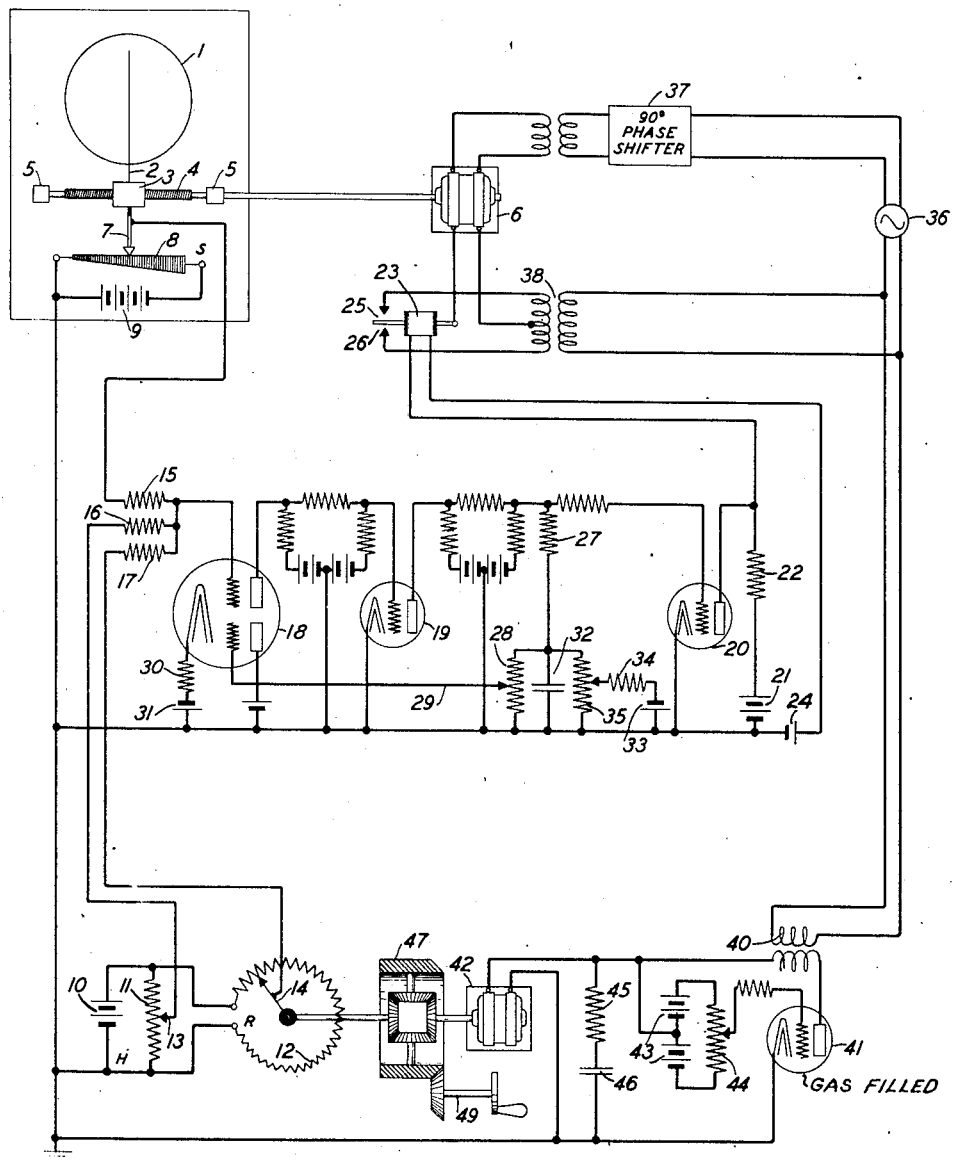

2,468,179

UNITED STATES PATENT OFFICE 2,468,179

TRACKING DEVICE

Sidney Darlington, New York, N. Y., and Clarence A. Lovell, Summit, N. J., assignors to Bell Telephone Laboratories, Incorporated, New York, N. Y., a corporation of New York Application July 17, 1943, Serial No. 495,131

4 Claims. (Cl. 235—61)

This invention relates to tracking devices and particularly to devices for tracking in slant range.

The object of the invention is a means for causing an indicator to track the slant range of an object moving at constant speed and constant height.

A feature of the invention is a means for deriving a motion proportional to the horizontal ground speed of the object.

Another feature of the invention is a means for controlling the tracking of the slant range by the derived value of the ground speed.

Other features and advantages of the invention will be apparent from the following description, and the drawing, which discloses a typical embodiment of the invention.

In many locating systems, such as anti-aircraft directors and computing sights for aerial bombing, the slant range or distance from a fixed point to a moving aircraft is continuously measured. In precision bombing, the aircraft must fly for an appreciable distance at constant speed and constant height. The slant range or distance may be measured from a fixed position on the ground to the moving aircraft, as in anti-aircraft artillery operation, or from the moving aircraft to a position on the ground, as in aerial bombing.

The slant range may be measured by an optical range finder, by two station ranging, or any optical, sonic, radio, or other method. In all such devices, the value of the slant range is manifested by some indicator. The object of the present invention is to control an indicator to follow the movement of the indicator on the range finder. Purely for the purposes of description, and not as any limitation on the scope of the invention, the present invention is shown operating in conjunction with a radio range finding system of the type shown in British Patent 535,120 accepted March 28, 1941, Compagnie Generale de Telegraphie sans Fil. In this system, the slant range is indicated by a bright spot on the screen of a cathode ray oscilloscope, the bright spot being traversed laterally across the screen proportionately to the slant range.

The range is indicated as a bright spot on the screen 1 of the cathode ray oscilloscope. An indicator 2, which may be in the form of a thin pointer, is mounted on a nut 3 laterally traversed across the screen of the oscilloscope by the threaded rod 4 journaled in suitable bearings 5 and rotated by the motor 6. A wiper 7 mounted upon, or driven by, the nut 2, but insulated therefrom, moves along the potentiometer winding 8.

A battery 9, or other suitable supply of voltage, is connected across the winding 8 of the potentiometer, the positive pole of the battery being grounded. A second battery 10, or other suitable supply of voltage, is connected across the windings 11 and 12 of two other potentiometers, the negative pole of the battery 10 being grounded. The potentiometer windings 8, 11 and 12, are so designed that the voltages selected by the wipers 7, 13 and 14 are respectively proportional to the square of the respective displacements of the wipers. The potentiometer windings may conveniently have the shape of long comparatively thin sheets of insulating material, closely and continuously wound with insulated wires. The sheets of insulating material are formed with one straight edge, along which the insulation of the wires is removed and on which the wiper is moved, the other edge being shaped to give the desired variation in voltage. If we let $W(X)$ equal the width of the strip of insulating material at any given point $X$, $R$ equal the resistance per unit length of the resistance wire, $N$ equal the turns of the wire per unit length of the card, and $R_M$ equal the total resistance of the potentiometer winding, then the resistance per unit length of the sheet of insulating material is equal to $2NRW(X)$ and the total resistance from one end of the card to the wiper located at a displacement $X$, $$R(X) = \int_0^X 2NRW(X).dX$$

thus $$W(X) = \frac{1}{2NR} \cdot \frac{dR(X)}{dX}$$

As the voltage is to vary in accordance with the square of the displacement of the wiper, in the present case $$W(X) = \frac{1}{2NR} \cdot \frac{dR_M X^2}{dX} = \frac{R_M}{2NR} \cdot 2X = \frac{R_M}{NR} X$$

The wiper 13 is adjusted to a displacement proportional to the known height $H$ of the aircraft.

The voltages selected by the wipers 7, 13 and 14 are supplied through the individual resistors 15, 16 and 17 to the input of a thermionic amplifier 18, which may be in the form of a double triode. The thermionic amplifier 18 is coupled to the thermionic amplifier 19 by a suitable interstage coupling network, which may be of the type disclosed in United States Patent 1,751,527, March 25, 1930, H. Nyquist. The thermionic amplifier 19 is similarly coupled by a suitable interstage coupling network to the thermionic amplifier 20.

The cathodes of the amplifiers 18, 19 and 20 are heated by conventional means (not shown).

A battery 21, or other suitable source of supply, supplies anode current through the coupling resistor 22 to the anode of the amplifier 20. The winding of a relay 23, in series with a battery 24, or other suitable source of voltage is connected across the output circuit of the amplifier 20. The voltage of the battery 24 is selected so that in the absence of a signal applied to the control grid of the amplifier 18, the positive voltage from the battery 24 exactly equals the positive potential of the anode of the amplifier 20, thus no current flows in the winding of the relay 23. The relay 23 is a polar relay normally biased to midposition, and capable of making contact with contact 25, or with contact 26, depending upon the polarity of the voltage applied to the winding of the relay 23.

A portion of the output of the amplifier 19 is supplied to the potential divider formed by the resistors 27 and 28 in series. A portion of the potential drop in the resistor 28 is selected by the wiper 29 and supplied to the control grid of the lower section of the double triode 18. The voltage from the wiper 29 forms a negative, or reverse, feedback to the input of the amplifier 18. A large value of negative feedback is used, and this large value of feedback has the effect of making the apparent input impedance of the amplifier 18, as viewed from the input grid of a very low value, thus no interaction is produced between the voltages selected by the wipers 7, 13 and 14. The large value of negative feedback also makes the amplification for any input substantially independent of the amplifying properties of the vacuum tube, and dependent only upon the relative magnitudes of the resistances of the resistors 27 and 28, compared to the resistances of the resistors 15, 16 and 17. If the resistances of the resistors 15, 16 and 17 are equal, then the voltages selected by the wipers 7, 13 and 14 will all be equally amplified.

A resistor 30, of comparatively high resistance, is connected between the cathode of the amplifier 18 and ground, in order to couple the lower section of the double triode to the upper section. A battery 31 or other suitable source of supply, is connected in series with the resistor 30 and adjusted so that in the absence of an applied signal the cathode of the amplifier 18 is at ground potential.

A capacitor 32, connected across the resistor 28, assists in producing rapid and accurate operation of the relay 23. A battery 33 or other suitable supply of voltage, supplies a potential through the resistors 34 and 35 to the control grids of the lower section of the amplifier 18 and the amplifier 20.

The voltage selected by the wiper 7 is proportional to $S^2$, the square of the slant range; the voltage selected by the wiper 13 is proportional to $H^2$, the square of the height; and the voltage selected by the wiper 14 is proportional to $R^2$, the square of the horizontal range. The height H, and the horizontal range R, are the two sides of a right triangle, of which the slant range S is the hypotenuse. Thus the voltages supplied to the input of the amplifier 18 are proportional to $H^2+R^2-S^2$, and if the wipers of the potentiometers are in the correct positions the sum of these voltages will equal zero. If the wipers of the potentiometers are not in the correct positions, the sum of the applied voltages will not be equal to zero, and a deviation voltage will be applied to the amplifier 20, causing the relay 23 to operate in a direction determined by the polarity of the deviation voltage.

Current is supplied from a suitable source 36 through the 90-degree phase shifting network 37 to one winding of the motor 6, which may conveniently be a two-phase motor. Current can also be supplied from the source 36 and the transformer 38, through the contact of relay 23 when operated, to the other phase of the motor 6. The phase of the current supplied by the transformer 38 to the winding of the motor 6 is determined by the contact 25 or 26 of the relay 23 which may be closed. Thus the operation of the relay 23 will cause the motor 6 to operate in such a direction as to move the wiper 7 along the potentiometer winding 8 until the deviation voltage is reduced to zero, and the relay 23 is released.

Current is also supplied from the source 36 or any other convenient source of power, through the transformer 40 to the anode circuit of a gaseous discharge, or trigger tube 41. The winding of a small direct current motor 42 is connected in series with the gaseous discharge tube 41, which acts as a single wave rectifier to supply pulsating unidirectional current to the motor 42. A battery 43, or other suitable source of voltage having an intermediate tap connected to one side of the winding of motor 42 is connected across the winding of a potentiometer 44, the wiper of the potentiometer being connected to the control grid of the gaseous discharge tube 41. By adjusting the wiper of the potentiometer 44 the electrical angle with respect to the alternating anode voltage of firing of the gaseous discharge tube 41 may be varied, thus adjusting the speed of the direct current motor 42 over a wide range. The resistor 45 and capacitor 46, connected in series across the motor 42, assists in securing a smooth variation in speed of the motor 42.

The motor 42 drives one pinion of a differential gear 47, which transmits this motion to the other pinion, driving the wiper 14.

If the aircraft is moving at constant speed, the ground speed, or rate of change in the horizontal range R is constant, thus if the wiper of the potentiometer 44 is adjusted to the correct value so that the motor 42 drives the wiper 14 at the correct value, the motor 6 will be controlled by the deviation voltage, so as to drive the wiper 7 at the correct speed to follow the steady change in the slant range S. This smooth automatic tracking of the slant range will thus eliminate the usual erratic errors produced by a human observer attempting to follow the movement of a moving aircraft.

By operating the handwheel 49 geared to the crown gear of the differential 47, the wiper 14 may be rapidly displaced, either to correct for minor errors in the setting of the slant range indicator, or to shift the slant range indicator from the indication for one target to the indication for a second target.

What is claimed is:

1. In a system including measuring means producing indications of the slant distance between two relatively moving objects, an indicator tracking said indications, a first source of voltage of one polarity, a first potentiometer having a winding linearly varying in resistance per unit length connected across said first source and a wiper, a second source of voltage of opposite polarity, a second potentiometer having a winding linearly varying in resistance per unit length connected across said second source and a wiper displaced proportionately to the difference in elevation between said objects, a third potentiometer having a winding linearly varying in resistance per unit length connected across said second source and a wiper, thermionic means having an input circuit connected to said wipers for adding the voltages selected by all said wipers, and an output circuit, motor means connected to said output circuit and controlled by the deviation of the sum of said voltages from zero to adjust said indicator and the wiper of said first potentiometer, other motor means for adjusting the wiper of said third potentiometer, and means for adjusting the speed of said other motor means to cause said indicator to track said indications of slant distance.

2. In a system including measuring means producing indications of the slant distance between two relatively moving objects, an indicator tracking said indications, a first source of voltage of one polarity, a first potentiometer having a winding linearly varying in resistance per unit length connected across said source and a wiper, a second source of voltage of opposite polarity, a second potentiometer having a winding linearly varying in resistance per unit length connected across said second source and a wiper displaced proportionately to the difference in elevation between said objects, a third potentiometer having a winding linearly varying in resistance per unit length connected across said second source and a wiper, thermionic means having an input circuit connected to said wipers for adding the voltages selected by all said wipers, and an output circuit, motor means connected to said output circuit and controlled by the deviation of the sum of said voltages from zero to adjust said indicator and the wiper of said first potentiometer, a differential gear including an adjustable frame and two pinions, having one pinion adjusting the wiper of said third potentiometer, other motor means driving the other pinion of said differential gear, manually operable means for adjusting the frame of said differential gear, and means for adjusting the speed of said other motor means.

3. In a system including means for producing indications of the slant distance between two relatively moving objects, an indicator tracking said indications, a first motor driving said indicator, a first source of voltage of one polarity, first means connected to said source and driven by said first motor to produce a voltage varying in amplitude proportionally to the square of said slant distance, a second source of voltage of the other polarity, second means connected to said second source and adjusted to produce a voltage proportional in amplitude to the square of the difference in elevation between said objects, third means connected to said second source and controlled to produce a voltage proportional in amplitude to the square of the horizontal distance between said objects, thermionic means having an input circuit connected to said first, second and third means to algebraically add said voltages and an output circuit connected to said first motor, to cause said first motor to drive said indicator and said first means to reduce the output voltage of said thermionic means to a minimum value, a second motor driving said third means, a source of power connected to said first motor, and manually controllable means connecting said second motor to said source of power.

4. The combination in claim 3 in which said manually controllable means controls the speed of said second motor.

SIDNEY DARLINGTON.
CLARENCE A. LOVELL.

REFERENCES CITED

The following references are of record in the file of this patent:

UNITED STATES PATENTS

| Number | Name | Date |
| --- | --- | --- |
| 2,134,901 | Wey | Nov. 1, 1938 |
| 2,145,591 | Fitzgerald | Jan. 31, 1939 |
| 2,401,779 | Swartzell | June 11, 1946 |